United States Patent [19]
Morooka

[11] Patent Number: 6,025,960
[45] Date of Patent: Feb. 15, 2000

[54] ZOOM OPTICAL SYSTEM

[75] Inventor: Masaru Morooka, Hachioji, Japan

[73] Assignee: Olympus Optical Co., Ltd., Tokyo, Japan

[21] Appl. No.: 09/219,362

[22] Filed: Dec. 23, 1998

[30] Foreign Application Priority Data

Dec. 24, 1997 [JP] Japan .................................. 9-355190

[51] Int. Cl.[7] .................................................. G02B 15/14
[52] U.S. Cl. ...................... 359/689; 359/681; 359/682; 359/686
[58] Field of Search .................... 359/686, 689, 359/681, 682

[56] References Cited

U.S. PATENT DOCUMENTS

| | | | |
|---|---|---|---|
| 4,978,204 | 12/1990 | Ito | 350/423 |
| 4,983,027 | 1/1991 | Kojima et al. | 350/427 |
| 5,315,439 | 5/1994 | Ito | 359/689 |
| 5,363,243 | 11/1994 | Takayuki et al. | 359/689 |
| 5,566,026 | 10/1996 | Yoon | 359/689 |
| 5,640,276 | 6/1997 | Ogata | 359/686 |

Primary Examiner—Georgia Epps
Assistant Examiner—Michael A Lucas
Attorney, Agent, or Firm—Pillsbury Madison & Sutro LLP

[57] ABSTRACT

The invention provides a compact zoom optical system which can be reduced in terms of the lens length upon collapsing, albeit having a zoom ratio as 3 or greater. The zoom optical system comprises a first lens group G1 having positive power, a second lens group G2 having positive power and a third lens group G3 having negative power. For zooming from the wide-angle end to telephoto end of the system, the lens groups move together toward the object side while the space between the first group G1 and the second group G2 becomes wide and the space between the second group G2 and the third group G3 becomes narrow. The second group G2 comprises a front lens subgroup $G_{2A}$ having negative power and a rear lens subgroup $G_{2B}$, between which an aperture stop S is located. At least one aspheric surface is used in the rear subgroup $G_{2B}$ in the second group G2. The optical system satisfies $0.4 < f_W/f_{1G} < 1.0$ where $f_W$ is the focal length of the optical system at the wide-angle end and $f_{1G}$ is the focal length of the first group G1.

25 Claims, 9 Drawing Sheets (Wide-Angle)

(Standard)

(Telephoto)

(Wide-Angle)

(Standard)

(Telephoto)

(Wide-Angle)

(Standard)

(Telephoto)

(Wide-Angle)

(Standard)

(Telephoto)

(Wide-Angle)

(Standard)

(Telephoto)

ZOOM OPTICAL SYSTEM

BACKGROUND OF THE INVENTION

1. Field of the Invention

The present invention relates generally to a zoom optical system, and more particularly to a zoom optical system used on photographic cameras, especially lens shutter cameras.

2. Discussion of Related Art

Recently prevailing lens shutter cameras are generally used with a built-in zoom lens. In particular, cameras having a zoom ratio of 3 or greater are now in great demand.

A lens shutter camera is desired to be reduced in both size and weight even when the phototaking lens used therewith has a high zoom ratio. Thus, reductions in lens diameter, and in the total lens length upon the so-called collapsing operation where adjacent lens groups are housed in a camera body with a decreasing air space therebetween are an important challenge to the development of lens systems.

Various types of zoom lenses are known for lens shutter cameras, and for zoom lens systems having a zoom ratio of 3 or greater, a three-group type having a positive-positive-negative power profile is often proposed.

To achieve some wide-angle shots in such a three-group zoom system having a positive-positive-negative power profile with a zoom ratio of 3 or greater, it is required to increase the composite refracting power of the first and second lens groups, each having positive power, at the wide-angle end. In particular, it is required to increase the number of lenses in the second lens group for correction of off-axis aberrations at the second lens group.

To achieve satisfactory performance over a zooming space from the wide-angle to telephoto end, it is required to reduce the amount of aberrations at each zoom lens group. Especially, the third lens group should be made up of two or more lenses because there is an increase in the amount of aberrations produced at the third lens group at the telephoto end.

It is thus difficult to decrease the total lens length of the system upon collapsing because of the increasing number of lenses in the second, and third lens group and, hence, an increase in the axial lens total length of the system.

Solutions to these problems are proposed in publications, for instance, JP-A's 6-265787, 8-136809, 8-152559, 8-179215 and 8-262325.

In the system disclosed in JP-A's 6-265787, 8-136809, 8-152559, and 8-179215, however, a stop is located between adjacent lens groups. As a result, the lens total length increases upon collapsing and so makes the thickness of the camera body large although the axial thickness of each lens group is reduced. This is because it is required to allow for a sufficient space between adjacent lens groups, thereby preventing interference between the stop member and the lens upon collapsing.

In the system disclosed in JP-A 8-262325, on the other hand, the number of lenses in each lens group is decreased by effective use of an aspheric surface. Since the image circle diameter is smaller than those of other prior art systems, the axial lens total length of each lens group is increased and so the lens total length cannot be fully decreased upon collapsing. Again, the thickness of the camera body becomes large upon collapsing.

SUMMARY OF THE INVENTION

In view of such prior art problems as described above, an object of the invention is to provide a compact zoom optical system which, albeit having a zoom ratio of 3 or greater, can be reduced in the lens total length upon collapsing.

According to one aspect of the invention, there is provided a zoom optical system comprising, in order from an object side of said system, a first lens group having positive refracting power, a second lens group having positive refracting power and a third lens group having negative refracting power, which move together toward the object side for zooming from a wide-angle end of said system to a telephoto end of said system while a space between the first lens group and the second lens group becomes wide and a space between the second lens group and the third lens group becomes narrow.

The second lens group comprises, in order from an object side thereof, a front lens subgroup having negative refracting power and a rear lens subgroup having positive refracting power.

An aperture stop is located between the front lens subgroup and the rear lens subgroup in the second lens subgroup.

An aspheric surface is used for at least one surface in the rear lens subgroup in the second lens group, and The zoom optical system satisfies the following condition (1):

$$0.4 < f_W/f_{1G} < 1.0 \tag{1}$$

where $f_W$ is a focal length of the zoom optical system at the wide-angle end and $f_{1G}$ is a focal length of the first lens group.

Preferably in the first zoom optical system of the invention, the first lens group comprises, in order from an object side thereof, a negative lens that is concave on the object side and a positive lens.

It is then preferable that the negative lens in the first lens that is group is a negative meniscus lens concave on the object side and the positive lens in the first lens group is a double-convex lens.

It is also preferable that the negative lens in the first lens group is a double-concave lens and the positive lens in the first lens group is a double-convex lens.

Preferably, in the first zoom optical system of the invention, the lens surface in the front lens subgroup in the second lens group, which surface is located nearest to the object side, is concave on the object side.

Preferably, in the first zoom optical system of the invention, the rear lens subgroup in the second lens group comprises a doublet consisting of a negative lens and a positive lens in order from an object side thereof.

Preferably, in the first zoom optical system of the invention, the third lens group comprises, in order from an object side thereof, a positive lens and a double-concave lens.

It is then preferable that the positive lens in the third lens that is group is a positive meniscus lens concave on the object side.

According to another aspect of the invention, there is provided a zoom optical system comprising, in order from an object side of said system, a first lens group having positive refracting power, a second lens group having positive refracting power and a third lens group having negative refracting power, which move together toward the object side for zooming from a wide-angle end of said system to a telephoto end of said system while a space between the first lens group and the second lens group becomes wide and a space between the second lens group and the third lens group becomes narrow.

The first lens group comprises, in order from an object side thereof, a negative lens that is concave on the object side and a positive lens.

The second lens group comprises, in order from an object side thereof, a front lens subgroup having negative refracting power and a rear lens subgroup having positive refracting power.

A lens surface in said front lens subgroup in said second lens group, which surface is located nearest to the object side, is concave on the object side.

The third lens group comprises, in order from an object side thereof, a positive lens and a double-concave lens, and an aperture stop is located between the front lens subgroup and the rear lens subgroup in the second lens group.

Preferably, in the second zoom optical system of the invention, an aspheric surface is used for at least one surface in the rear lens subgroup in the second lens group.

Throughout the first, and second zoom optical systems of the invention, it is preferable that the front lens subgroup in the second lens group comprises, in order from an object side thereof, a negative lens that is concave on the object side and a double-convex lens.

Throughout the zoom optical systems of the invention, it is preferable that the third lens group has at least one aspheric surface therein;

focusing to a nearby object is achieved by moving the second lens group toward the object side, and the following condition is satisfied:

$$3.5 < \beta_{3GT} \quad (2)$$

where $\beta_{3GT}$ is a transverse magnification of the third lens group at the telephoto end of the system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
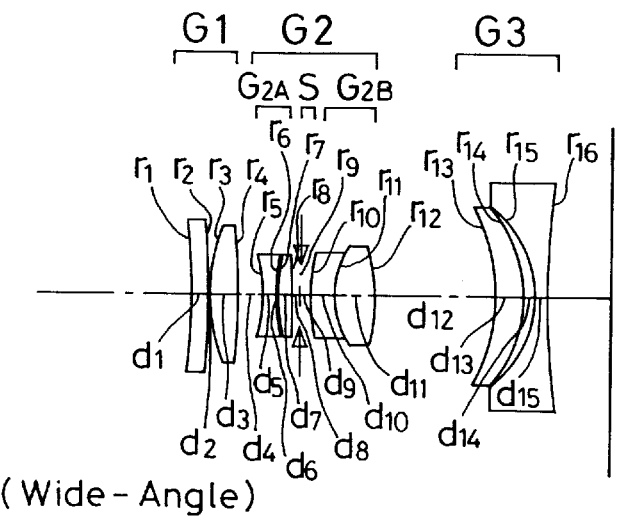
FIG. 1 is a sectional view that illustrates one lens layout in Example 1 of the zoom optical system according to the invention.
Figure 1:
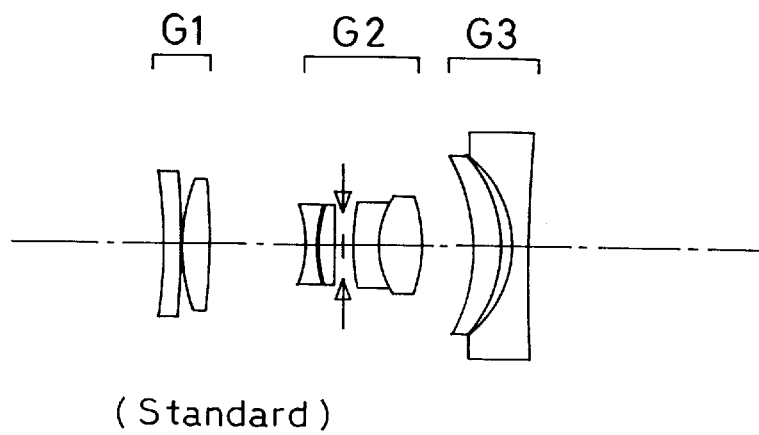
Figure 1:
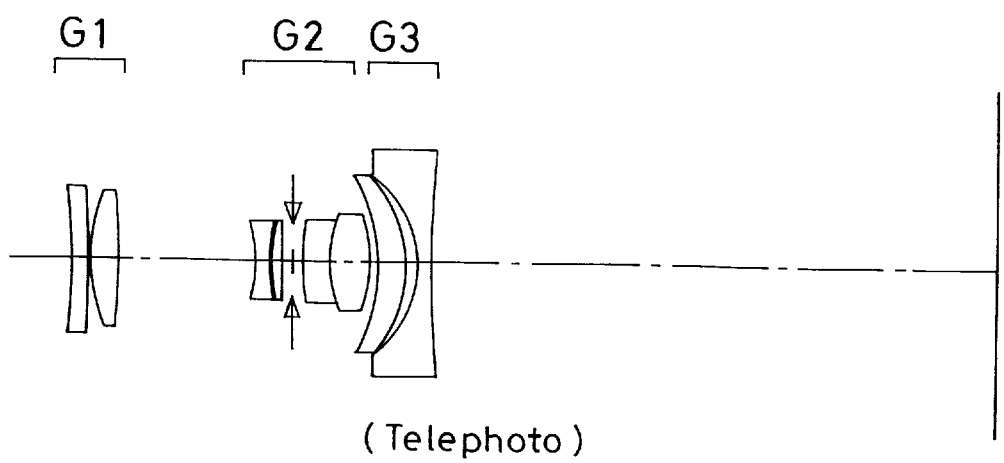

Why the above arrangements or layouts are used in the invention, and how they operate will now be explained in detail.

The first zoom optical system of the invention is a three-group zoom system comprising, in order from an object side of the system, a first lens group having positive refracting power, a second lens group having positive refracting power and a third lens group having negative refracting power, wherein, for zooming from the wide-angle end of the system to the telephoto end of the system, the lens groups move together toward the object side in such a manner that the space between the first lens group and the second lens group becomes wide and the space between the second lens group and the third lens group becomes narrow.

Then, the second lens group is designed as a retrofocus type comprising, in order from an object side thereof, a front lens subgroup $G_{2A}$ having negative refracting power and a ar lens subgroup $G_{2B}$ having positive refracting power. It is thus possible to bring a principal point position of the second lens group nearer to an image plane, thereby ensuring a sufficient back focus at the wide-angle end and making satisfactory correction for positive distortion.

In this three-group zooming system, chromatic aberrations produced at the first lens group itself are so reduced that chromatic aberrations produced throughout the lens system can be reduced by opposite chromatic aberrations produced at the second, and third lens groups. To make the zoom ratio of the system high, however, it is required to increase the refracting power of each lens group, resulting in an increase in the amount of chromatic aberrations produced at the second lens group in particular.

According to the invention, this is avoided by locating an aperture stop between the front lens subgroup $G_{2A}$ and the rear lens subgroup $G_{2B}$ in the second lens group. In this lens layout where off-axis bundles before and after the aperture stop in the second lens group are not largely spaced away from the optical axis, chromatic aberrations produced before and after the aperture stop can be reduced. When the chromatic aberrations produced at the second lens group are reduced, it is possible to lessen the load of the third lens group on correction of chromatic aberrations and, hence, decrease the number of lenses in the third lens group.

In the invention, spherical aberrations and comae produced at the second lens group are reduced to some extent by allowing the front lens subgroup $G_{2A}$ in the second lens group to produce positive spherical aberration and negative coma and the rear lens subgroup $G_{2B}$ in the second lens group to produce negative spherical aberration and positive coma. To make the zoom ratio of the system high, however, it is required to increase the refracting power of the second lens group. In particular, it is required to increase the refracting power of $G_{2B}$ that is a positive lens group, because the second lens group is on the whole a positive lens group. This in turn causes increases in negative spherical aberration (at the telephoto end) produced at the rear lens subgroup $G_{2B}$ in the second lens group and positive coma produced throughout the zooming space, resulting in an increase in the load of the rear lens subgroup $G_{2B}$ on correction of aberrations. If the number of lenses in the rear lens subgroup $G_{2B}$ in the second lens group is increased, the rear lens subgroup $G_{2B}$ can then make satisfactory correction for aberrations even at a high zoom ratio, so that spherical aberrations and comae produced in the second lens group can be reduced. However, the increasing number of lenses gives rise to an increase in the axial total length of the second lens group, and so is unfavorable to decrease the total length of the system upon collapsing.

To solve this problem, the present invention uses an aspheric surface for at least one lens surface in the rear lens subgroup $G_{2B}$ in the second lens group, thereby allowing the rear lens subgroup $G_{2B}$ to make satisfactory correction for aberrations. Even at a higher zoom ratio, it is thus possible to alleviate the load of the rear lens subgroup $G_{2B}$ on the correction of aberrations and, hence, decrease the number of lenses in the rear lens subgroup $G_{2B}$ in the second lens group.

According to the invention, it is possible to provide a zoom optical system which, albeit having a zoom ratio as high as 3 or greater, is less susceptible to aberration fluctuations during zooming from the wide-angle to telephoto end, so that aberrations produced throughout the lens system can be reduced, and the number of lenses in each lens group can be decreased. The decrease in the number of lenses ensures a decrease in the axial total length of the lens system, and the location of the aperture stop in the second lens group makes it possible to avert interference between the stop member and the lens group during collapsing. It is thus possible to decrease the total length of the lens system upon collapsing.

In a high-zoom-ratio zoom system such as one contemplated herein, there is an increase in the amount of movement of the first lens group from the wide-angle to telephoto end. To decrease the total length of the lens system upon collapsing, however, it is required to use a collapsible lens barrel comprising a plurality of stages, because the total length of the lens barrel cannot be longer than the total length of the lens system wherein an air space between adjacent lens groups is narrow. This collapsible lens barrel is useful to decrease the thickness of a camera in the optical axis direction but is contrary to making the camera compact because of an increased diameter. In other words, it is required to reduce the amount of movement of the first lens group for zooming.

In the invention, the first lens group should thus satisfy the refracting power defined by the above condition (1). If condition (1) is satisfied, the zoom optical system of the invention can maintain satisfactory optical performance even when the amount of movement of the first lens group is reduced to a suitable level.

Exceeding the upper limit of 1.0 in condition (1) is favorable for correction of aberrations because the refractive power of the first lens group becomes weak. However, this is contrary to making a camera compact because of an increase in the amount of movement of the first lens group from the wide-angle to telephoto end. A deviation from the lower limit of 0.4 in condition (1) is favorable to reduce the amount of movement of the first lens group from the wide-angle to telephoto end, because the refracting power of the first lens group becomes strong. However, this is again contrary to making the camera thin, because some large chromatic aberrations and curvature of field are produced at the telephoto end. In other words, the number of lenses in the first lens group should be increased so as to make correction for such large aberrations, resulting in an increase in the total length of the lens system upon collapsing.

Preferably in the first zoom optical system of the invention, the first lens group comprises, in order from an object side thereof, a negative lens that is concave on the object side and a positive lens.

In the three-group zoom system of the invention, chromatic aberrations produced at the first lens group are reduced, as already explained. This is because the negative, and positive lenses in the first lens group produce chromatic aberrations that are of opposite signs and cancel out each other. It is thus unnecessary to largely reduce chromatic aberrations produced at each of the positive, and negative lenses in the first lens group. In other words, the load of each lens on correction of chromatic aberrations is so alleviated that aberrations other than the chromatic aberrations can be easily corrected. It is thus possible to construct the first lens group of one negative lens and one positive lens.

For a high-zoom-ratio zoom lens system such as one contemplated herein, the power of the first lens group should be increased to some extent. If the first lens group is designed as a retrofocus type comprising a negative lens and a positive lens in order from an object side thereof, the refracting power of the first lens group can then be increased to some extent while a sufficient back focus is maintained.

To ensure a sufficient back focus at the wide-angle end, it is required to bring a principal point position of the first lens group nearer to an image. To this end it is desired that the negative lens be concave on the object side. However, aberrations produced at the negative lens itself become large. This is the reason relatively weak refracting power is imparted to the negative lens in the first lens group used herein. Although the negative lens used herein is concave on the object side, it is still possible to ensure a sufficient back focus at the wide-angle end, because the spherical aberration and coma of the negative lens itself are small, and because the positive lens located on the image side of the negative lens is designed to produce moderate spherical aberration and coma, so that aberrations produced throughout the system can be well corrected. Also, the refracting power of the negative lens can be so diminished that manufacturing tolerances for the decentration, surface accuracy, etc. of the negative lens itself can be extended to a significant degree.

For correction of aberrations, it is then desired that the first lens group be composed of, in order from the object side, a negative meniscus lens that is concave on the object side and a double-convex lens.

It is thus possible to construct the first lens group of two lenses, one negative lens and one positive lens, and so it is possible to reduce the axial total length of the first lens group and, hence, the total length of the system upon collapsing.

In the first zoom optical system of the invention, it is desired that the lens surface in the rear lens subgroup in the second lens group, which surface is located nearest to the object side, be concave on the object side.

In the three-group zooming system of the invention, negative curvature of field produced at the first, and third lens groups is canceled out by positive curvature of field produced at the second lens group, so that curvature of field produced throughout the zooming system can be well corrected. To make satisfactory correction for the negative curvature of field produced at the first lens group in particular, it is desired that the lens surface in the front lens subgroup $G_{2A}$ nearest to the first lens group, which surface is located nearest to the object side, be concave on the object side.

In the first zoom optical system of the invention, it is desired in view of manufacturing errors that the rear lens subgroup in the second lens group be composed of a doublet consisting of a negative lens and a positive lens in order from an object side thereof.

In the present invention, aberrations produced throughout the system can be well corrected by moderate positive curvature of field produced at the second lens group, as already explained. In the second lens group with the aperture stop located between the front lens subgroup $G_{2A}$ and the rear lens subgroup $G_{2B}$, however, positive curvature of field is produced at the front lens subgroup $G_{2A}$ having negative refracting power and negative curvature of field is produced at the rear lens subgroup $G_{2B}$ having positive refracting power. To make satisfactory correction for curvature of field produced throughout the system, it is thus required to reduce as much as possible the negative curvature of field produced at the rear lens subgroup $G_{2B}$ in the second lens group. According to the invention, this is achieved by disposing a negative lens and a positive lens in the rear lens subgroup $G_{2B}$ in the described order, and making the cemented surface thereof convex on the object side.

In the zoom optical system of the invention, it is desired that the third lens group be composed of, in order from an object side thereof, a positive lens and a double-concave lens.

In the invention, correction of positive curvature of field produced at the second lens group is shared by the third lens group. For this purpose, a negative lens having a curvature stronger on the object side than on the image side is used in the third lens group to produce negative curvature of field, thereby sharing the correction of the positive curvature of field produced at the second lens group. Preferably, a lens capable of producing much curvature of field is preferably located at a position where an off-axis bundle attains a certain height, i.e., nearest to the image side of the third lens group. More preferably, a positive lens is used for making correction for chromatic aberrations at the third lens group. To make satisfactory correction for distortion produced throughout the system, it is even more preferable that the surface in the third lens group, which surface is located nearest to the image side thereof, is defined by a concave surface. To this end it is desired to use a double-concave lens for the negative lens on the image side.

According to the invention, spherical aberration and coma produced at the second lens group are corrected by the third lens group, because the spherical aberration and coma produced at the second lens group are small, as already explained. For the purpose of making satisfactory correction for negative spherical aberration and positive coma produced at the first lens group according to the invention, a lens that is convex on the image side is used in the third lens group to produce moderate spherical aberration and coma, which are in turn canceled out by the negative spherical aberration and positive coma, so that spherical aberration and coma produced throughout the system can be well corrected. More preferably, a lens capable of producing much spherical aberration is located at a position wherein an off-axis light bundle attains a certain height, i.e., nearest to the image Atf side of the third lens group. To this end, it is even more preferable that the positive lens on the object side of the third lens group is defined by a meniscus lens that is convex on the image side.

To reduce the axial total length of the third lens group so that the second lens group can be closest to the third lens group upon collapsing, it is then preferable that the positive lens in the third lens group is defined by a positive meniscus lens concave on the object side.

According to the second aspect of the invention, there is provided a zoom optical system comprising, in order from an object side of said system, a first lens group having positive refracting power, a second lens group having positive refracting power and a third lens group having negative refracting power, which move together toward said object side for zooming from a wide-angle end of said system to a telephoto end of said system while a space between said first lens group and said second lens group becomes wide and a space between said second lens group and said third lens group becomes narrow.

The first lens group comprises, in order from an object side thereof, a negative lens concave on the object side and a positive lens.

The second lens group comprises, in order from an object side thereof, a front lens subgroup having negative refracting power and a rear lens subgroup having positive refracting power.

A lens surface in the front lens subgroup in the second lens group, which surface is located nearest to the object side, is concave on the object side.

The third lens group comprises, in order from an object side thereof, a positive lens and a double-concave lens, and an aperture stop is located between the front lens subgroup and the rear lens subgroup in the second lens group.

In the three-group zooming system of the invention where off-axis bundles before and after the aperture stop in the second lens group are not largely spaced away from the optical axis, as already explained, chromatic aberrations produced before and after the aperture stop can be reduced. When the chromatic aberrations produced at the second lens group are reduced, it is possible to lessen the load of the third lens group on correction of chromatic aberrations and, hence, decrease the number of lenses in the third lens group.

In the three-group zooming system of the invention wherein chromatic aberrations produced at the first lens group are reduced, it is possible to construct the first lens group of one negative lens and one positive lens.

If, as already explained, the first lens group is designed as a retrofocus type comprising a negative lens and a positive lens in order from an object side thereof, the refracting power of the first lens group can then be increased to some extent while a sufficient back focus is maintained. To ensure a sufficient back focus at the wide-angle end, it is required to bring a principal point position of the first lens group nearer to an image. To this end it is desired that the negative lens be concave on the object side. However, aberrations produced at the negative lens itself become large. This is the reason relatively weak refracting power is imparted to the negative lens in the first lens group used herein. Although the negative lens used herein is concave on the object side, yet it is possible to ensure a sufficient back focus at the wide-angle end, because the spherical aberration and coma of the negative lens itself are small, and because the positive lens located on the object side of the negative lens is designed to produce moderate spherical aberration and coma, so that aberrations produced throughout the system can be well corrected. Also, the refracting power of the negative lens can be so diminished that manufacturing tolerances for the decentration, surface accuracy, etc. of the negative lens itself can be extended to a significant degree.

In the three-group zooming system of the invention, negative curvature of field produced at the first, and third lens groups is canceled out by positive curvature of field produced at the second lens group, so that curvature of field-produced throughout the zooming system can be well corrected. To make satisfactory correction for the negative curvature of field produced at the first lens group in particular, it is desired that a lens surface in the front lens subgroup $G_{2A}$ nearest to the first lens group, which surface is located nearest to the object side, be concave on the object side.

In the three-group zooming system of the invention, correction of positive curvature of field produced at the second lens group is shared by the third lens group. For this purpose, a negative lens having a curvature stronger on the object side than on the image side is used in the third lens group to produce negative curvature of field, thereby sharing the correction of the positive curvature of field produced at the second lens group. For the purpose of making satisfactory correction for negative spherical aberration and positive coma produced at the first lens group according to the invention, a lens that is convex on the image side is used in the third lens group to produce moderate spherical aberration and coma, which are in turn canceled out by the negative spherical aberration and positive coma, so that spherical aberration and coma produced throughout the system can be well corrected. Preferably in this case, a lens capable of producing much spherical aberration is located at a position wherein an off-axis light bundle attains a certain height, and a lens capable of producing much curvature of field is located at a position where an off-axis bundle attains a certain height. For correction of chromatic aberrations at the third lens group, it is desired that the lens convex on the image side be defined by a positive lens. For correction of distortion produced throughout the zooming system, it is desired that the surface located nearest to the image side of the third lens group be defined by a surface that is concave on the image side, and so the negative lens on the image side is defined by a double-concave lens.

According to the invention, it is thus possible to provide a zoom optical system which, albeit having a zoom ratio as high as 3 or greater, is less susceptible to aberration fluctuations during zooming from the wide-angle to telephoto end, so that aberrations produced throughout the lens system can be reduced, and the number of lenses in each lens group can be easily decreased. The decrease in the number of lenses ensures a decrease in the axial total length of the lens system, and the location of the aperture stop in the second lens group makes it possible to avert interference between the stop member and the lens group during collapsing. It is thus possible to decrease the total length of the lens system upon collapsing.

In the first, and second zooming optical systems of the invention, it is desired that the front lens subgroup in the second lens group be composed of, in order from an object side thereof, a negative lens concave on the object side and a double-convex lens.

To make satisfactory correction for negative curvature of field produced at the first lens group according to the invention, it is desired that the surface in the front lens subgroup $G_{2A}$ nearest to the first lens group, which surface is located nearest to the object side, be defined by a lens surface that is convex on the object side. To prevent the back focus of the system from becoming too short, it is also desired that the front lens subgroup $G_{2A}$ in the second lens group be made up of, in order from the object side, a negative lens and a double-convex lens.

In the second zoom optical system of the invention, it is desired that at least one aspheric surface be used in the rear lens subgroup in the second lens group.

In the invention, spherical aberrations and comae produced at the second lens group are reduced to some extent by allowing the front lens subgroup $G_{2A}$ in the second lens group to produce positive spherical aberration and negative coma and the rear lens subgroup $G_{2B}$ in the second lens group to produce negative spherical aberration and positive coma, as already explained. To make the zoom ratio of the system high, however, it is required to increase the refracting power of the second lens group. This in turn causes increases in the negative spherical aberration (at the telephoto end) produced at the rear lens subgroup $G_{2B}$ in the second lens group and positive coma produced throughout the zooming space, resulting in an increase in the load of the rear lens subgroup $G_{2B}$ on correction of aberrations. To solve this problem, the present invention uses an aspheric surface for at least one lens surface in the rear lens subgroup $G_{2B}$ in the second lens group, thereby allowing the rear lens subgroup $G_{2B}$ to make satisfactory correction for aberrations. Even at a higher zoom ratio, it is thus possible to alleviate the load of the rear lens subgroup $G_{2B}$ on the correction of aberrations and, hence, decrease the number of lenses in the rear lens subgroup $G_{2B}$ in the second lens group.

In the three-group zooming system of the invention, it is desired that at least one aspheric surface be used in the third lens group.

In the present invention, spherical aberration and coma produced at the second lens group are small, as already mentioned, so that spherical aberration and coma produced at the first lens group can be corrected by the third lens group. To make the zoom ratio of the system high, however, it is required to increase the refracting power of the third lens group. This in turn causes spherical aberration and coma to become too large at the telephoto end, and so renders it impossible to achieve satisfactory optical performance throughout the system. To avoid this, the present invention uses an aspheric surface for the surface in the third lens group, which surface is concave on the object side, thereby making moderate correction for spherical aberration and coma at the third lens group.

In the three-group zoom system of the invention, it is desired that focusing to a nearby object be achieved by moving the second lens group toward the object side.

In the present invention, focusing is performed by moving the aperture stop in unison with the second lens group while the aperture stop is located in the front lens subgroup $G_{2A}$ and the rear lens subgroup $G_{2B}$ in the second lens group. With this arrangement it is possible to achieve satisfactory optical performance with respect to the nearby object. This is because even when the second lens group moves during focusing, the height of an off-axis bundle passing through the second lens group is less susceptible to fluctuations before and after the aperture stop, and so off-axis aberrations are less susceptible to fluctuations due to focusing.

In the three-group zooming system of the invention, it is desired that the aforesaid condition (2) be satisfied so as to achieve a zoom ratio as high as 3 or greater.

A deviation from the lower limit of 3.5 in condition (2) is contrary to making a camera compact because the load of zooming shared by the third lens group is transferred to the second lens group, resulting in an increase in the amount of movement of each lens group.

The zooming optical systems of the invention are now explained more specifically with reference to Examples 1 to 5.

FIGS. 1, 2, 3, and 4 are sectional views illustrating lens layouts in Examples 1, 2, 4, and 5 of the zooming optical systems according to the invention at wide-angle and telephoto ends inclusive of standard settings. A lens layout in Example 3 is not illustrated because of being the same as that in Example 1. Numerical data in each example will be enumerated.

EXAMPLE 1

As illustrated in FIG. 1, Example 1 is directed to a zoom optical system composed of, in order from an object side of the system, a first lens group G1 consisting of a negative meniscus lens concave on an object side thereof and a double-convex lens, a second lens group G2 made up of a front lens subgroup $G_{2A}$ consisting of a double-concave lens and a double-convex lens, an aperture stop S and a rear lens subgroup $G_{2B}$ consisting of a doublet consisting of a negative meniscus lens convex on an object side thereof and a double-convex lens, and a third lens group G3 consisting of a positive meniscus lens convex on an image side thereof and a double-concave lens. Two aspheric surfaces are used, one for the surface in the second lens group G2, which surface is located nearest to an image side thereof, and one for the surface in the third lens group G3, which surface is located nearest to an object side thereof.

For zooming from the wide-angle to telephoto end of the system, the lens groups move together toward the object side of the system while the space between the first lens group G1 and the second lens group G2 becomes wide and the space between the second lens group G2 and the third lens group G3 becomes narrow. For focusing, the second lens group G2 is moved out toward the object side.

EXAMPLE 2

Figure 2:
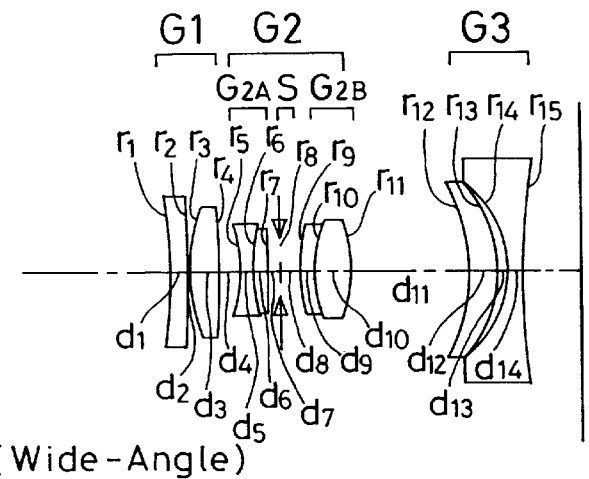
FIG. 2 is a sectional view that illustrates one lens layout in Example 2 of the zoom optical system according to the invention.
Figure 2:
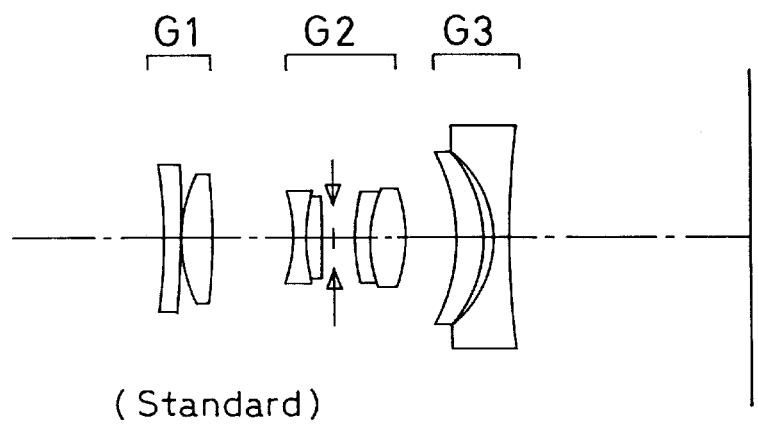
Figure 2:
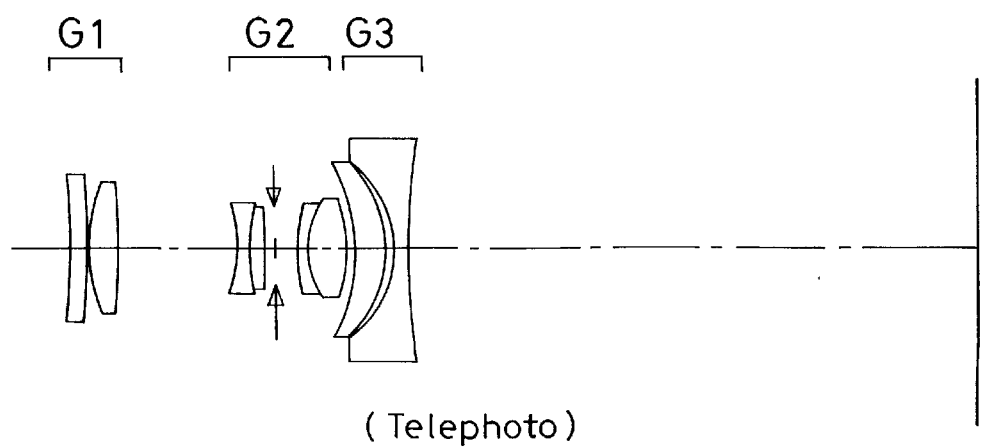
Figure 3:
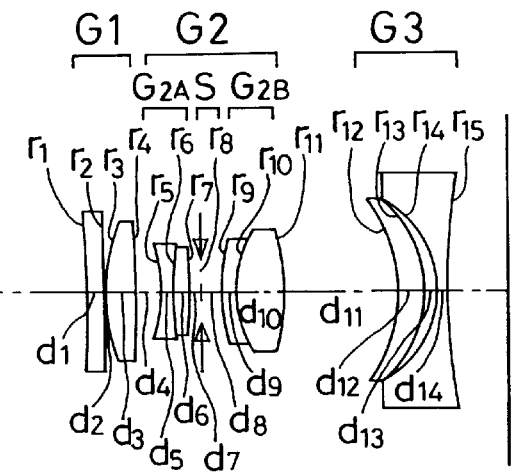
FIG. 3 is a sectional view that illustrates one lens layout in Example 4 of the zoom optical system according to the invention.
Figure 3:
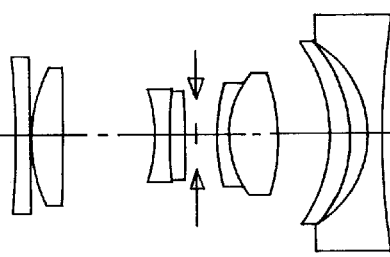
Figure 3:
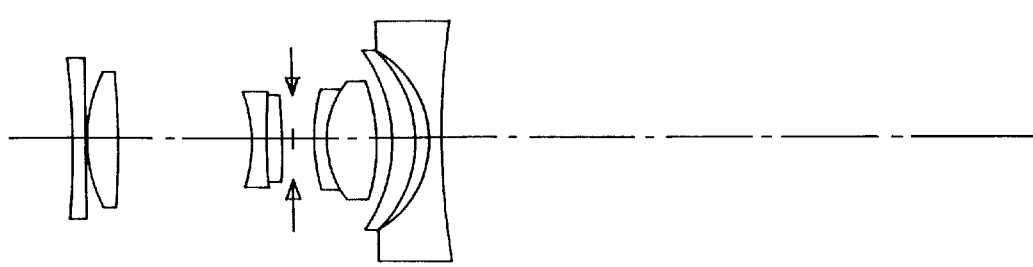

As illustrated in FIG. 2, Example 2 is directed to a zoom optical system composed of, in order from an object side of the system, a first lens group G1 consisting of a negative meniscus lens concave on an object side thereof and a double- convex lens, a second lens group G2 made up of a front lens subgroup $G_{2A}$ consisting of a double-concave lens and a double-convex lens, an aperture stop S and a rear lens subgroup $G_{2B}$ consisting of a doublet consisting of a negative meniscus lens convex on an object side thereof and a double-convex lens, and a third lens group G3 consisting of a positive meniscus lens convex on an image side thereof and a double-concave lens. Two aspheric surfaces are used, one for the surface in the second lens group G2, which surface is located nearest to an image side thereof, and one for the surface in the third lens group G3, which surface is located nearest to an object side thereof.

For zooming from the wide-angle to telephoto end of the system, the lens groups move together toward the object side of the system while the space between the first lens group G1 and the second lens group G2 becomes wide and the space between the second lens group G2 and the third lens group G3 becomes narrow. For focusing, the second lens group G2 is moved out toward the object side.

EXAMPLE 3

Example 3 is the same in construction as Example 1.

EXAMPLE 4

Example 4 is directed to a zoom optical system composed of, in order from an object side of the system, a first lens group G1 consisting of a double-concave lens and a double-convex lens, a second lens group G2 made up of a front lens subgroup $G_{2A}$ consisting of a doublet consisting of a double-concave lens and a double-convex lens, an aperture stop S and a rear lens subgroup $G_{2B}$ consisting of a doublet consisting of a negative meniscus lens convex on an object side thereof and a double-convex lens, and a third lens group G3 consisting of a positive meniscus lens convex on an image side thereof and a double-concave lens. Two aspheric surfaces are used, one for the surface in the second lens group G2, which surface is located nearest to an image side thereof, and one for the surface in the third lens group G3, which surface is located nearest to an object side thereof.

For zooming from the wide-angle to telephoto end of the system, the lens groups move together toward the object side of the system while the space between the first lens group G1 and the second lens group G2 becomes wide and the space between the second lens group G2 and the third lens group G3 becomes narrow. For focusing, the second lens group G2 is moved out toward the object side.

EXAMPLE 5

Figure 4:
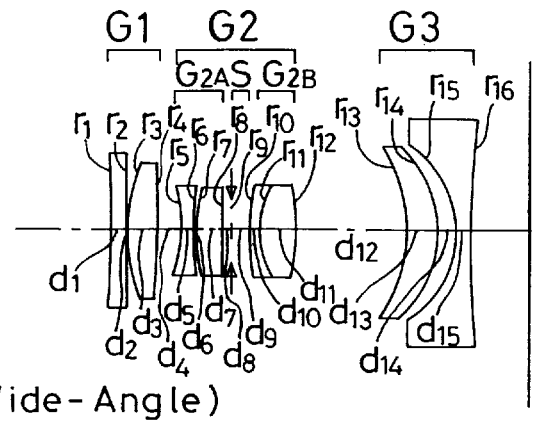
FIG. 4 is a sectional view that illustrates one lens layout in Example 5 of the zoom optical system according to the invention.
Figure 4:
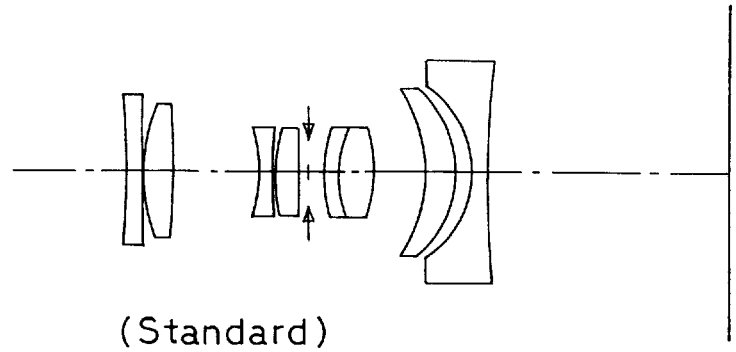
Figure 4:
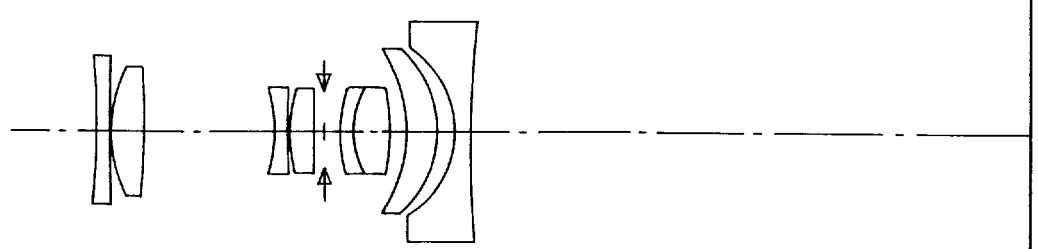
Figure 5A:
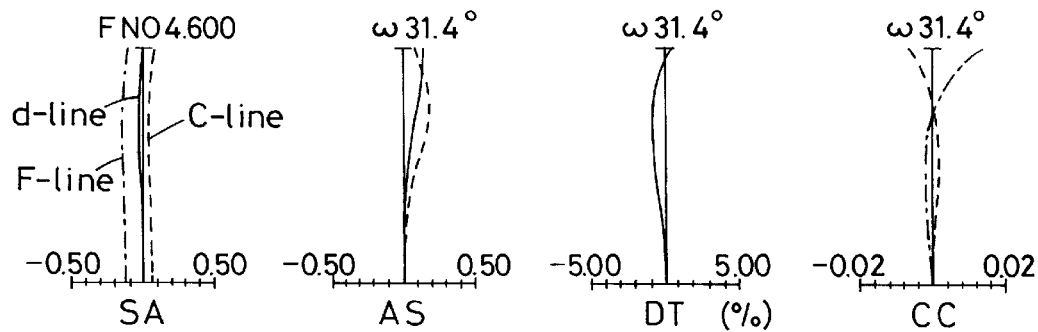
FIGS. 5(a), 5(b) and 5(c) are aberration diagrams for Example 1.
Figure 5B:
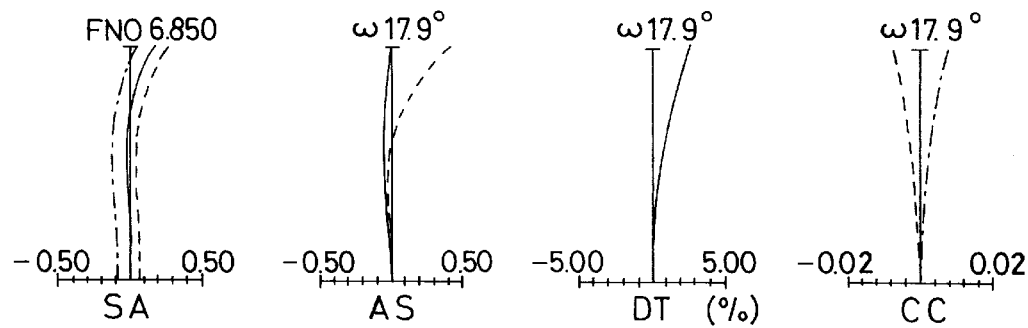
Figure 5C:
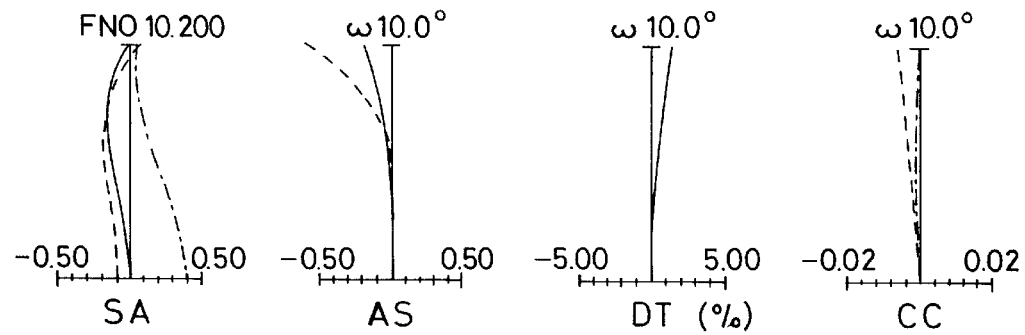
Figure 6A:
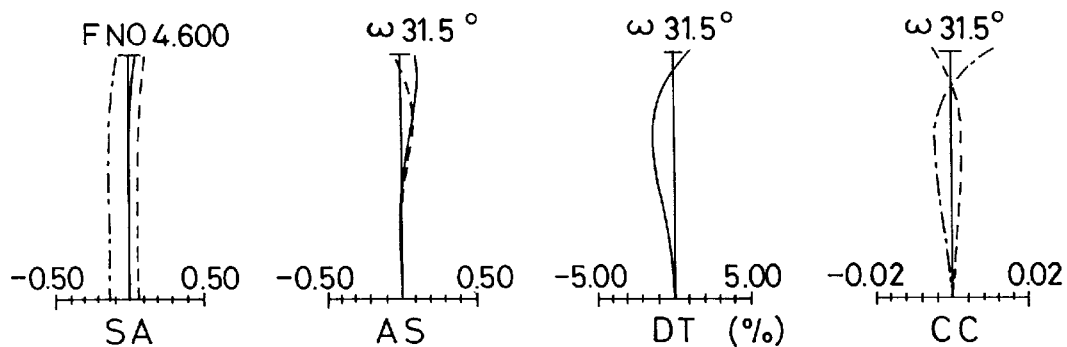
FIGS. 6(a), 6(b) and 6(c) are for Example 2.
Figure 6B:
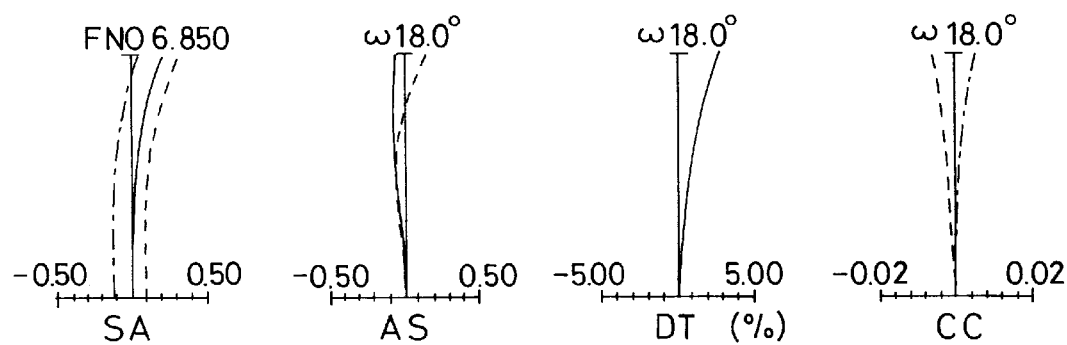
Figure 6C:
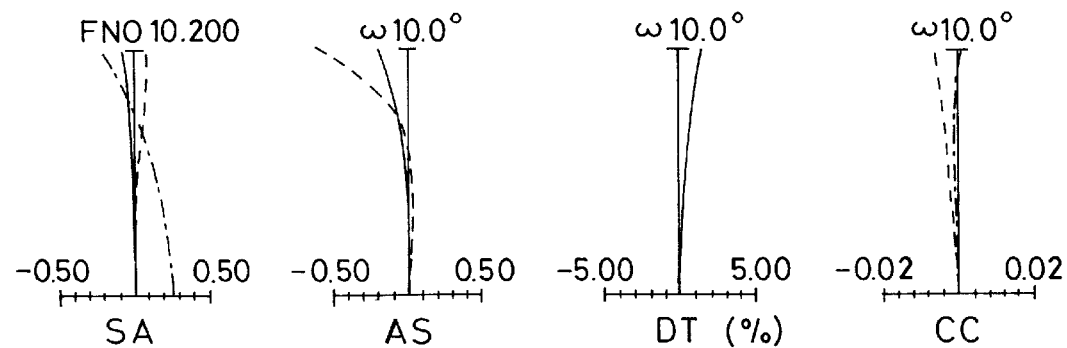
Figure 7:
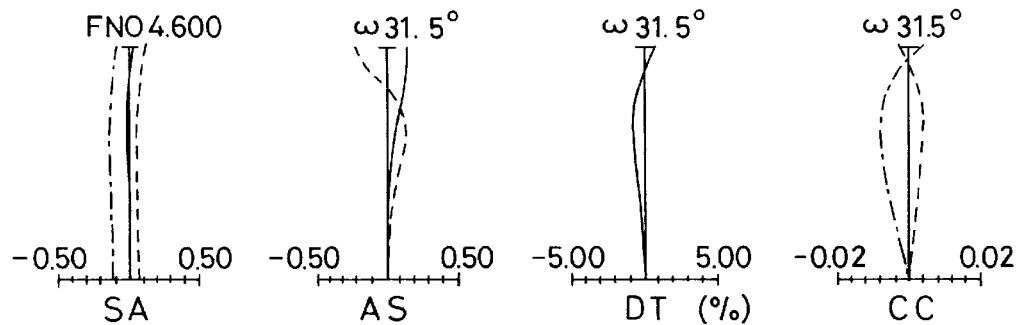
FIGS. 7(a), 7(b) and 7(c) are for Example 3.
Figure 7:
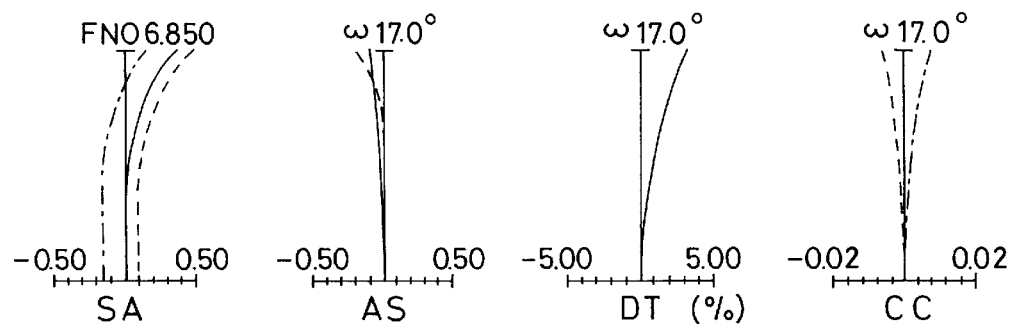
Figure 7:
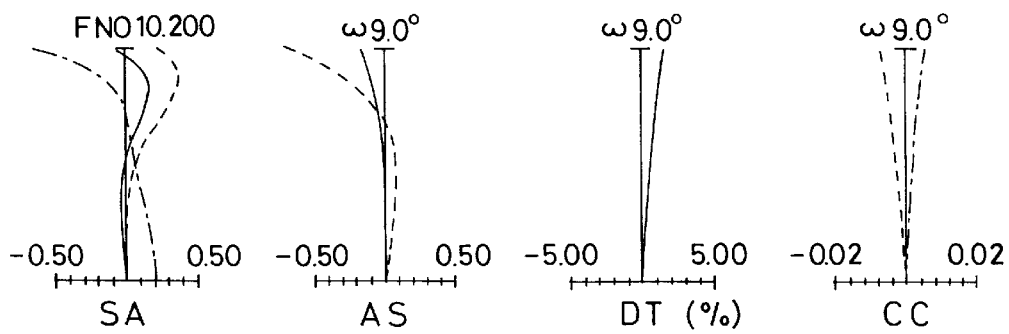
Figure 8A:
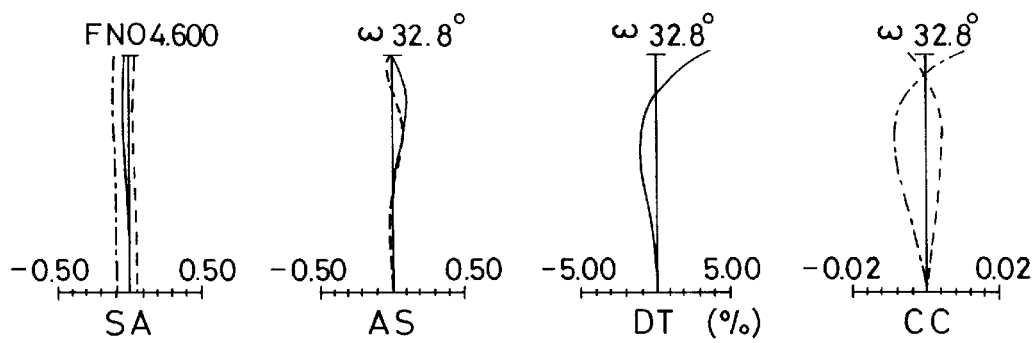
FIGS. 8(a), 8(b) and 8(c) are for Example 4.
Figure 8B:
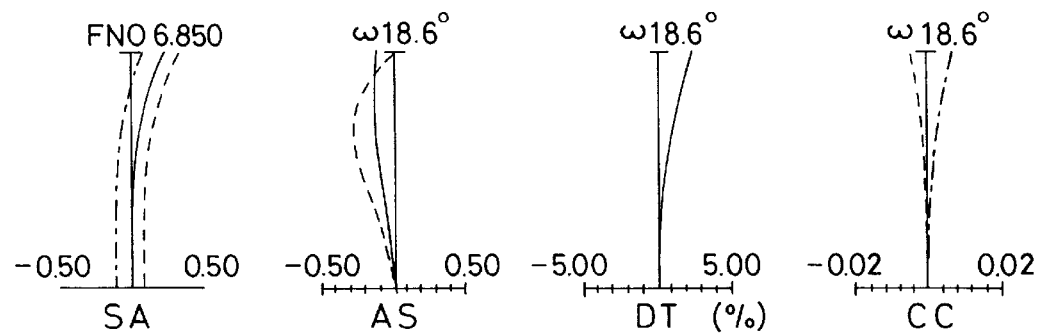
Figure 8C:
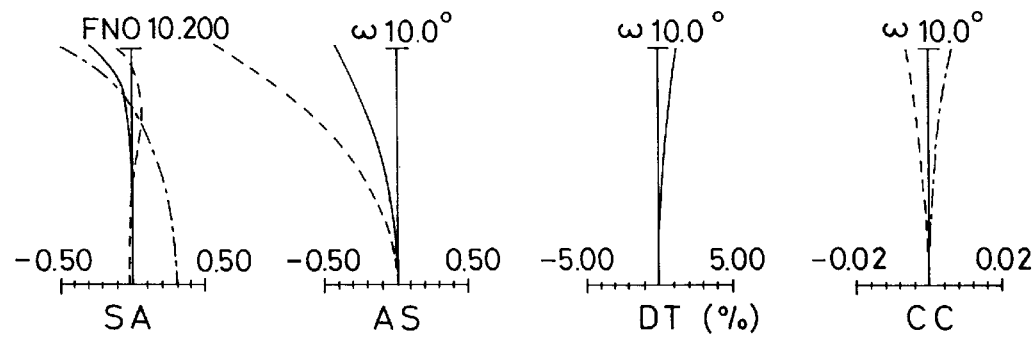
Figure 9A:
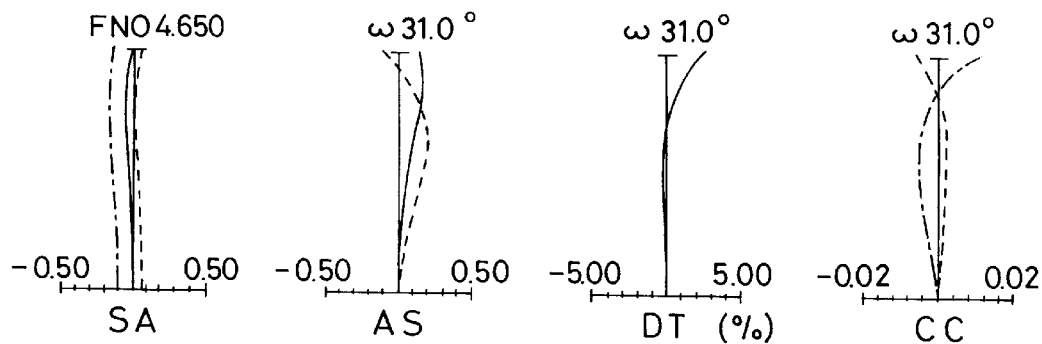
FIGS. 9(a), 9(b) and 9(c) are for Example 5.
Figure 9B:
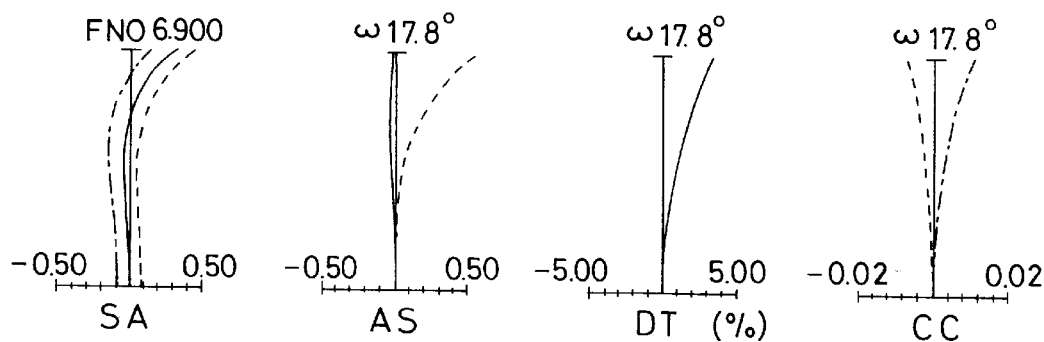
Figure 9C:
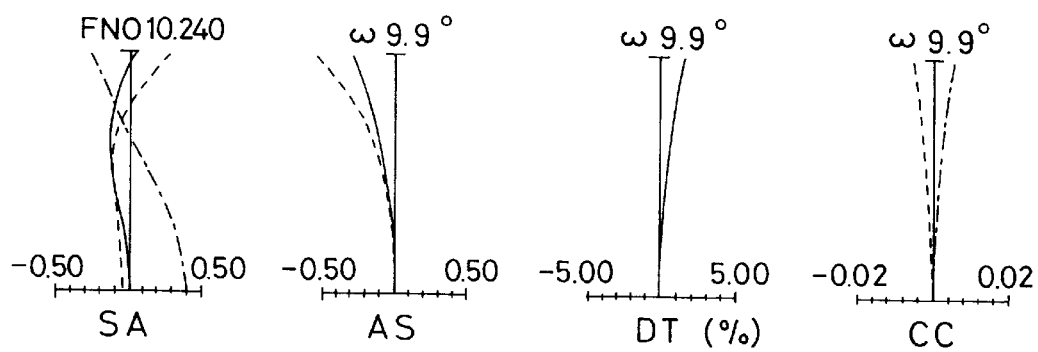

As illustrated in FIG. 4, Example 5 is directed to a zoom optical system composed of, in order from an object side of the system, a first lens group G1 consisting of a double-concave lens and a double-convex lens, a second lens group G2 made up of a front lens subgroup $G_{2A}$ consisting of a double-concave lens and a plano-convex lens, an aperture stop S and a rear lens subgroup $G_{2B}$ consisting of a doublet consisting of a negative meniscus lens convex on an object side thereof and a double-convex lens, and a third lens group consisting of a positive meniscus lens convex on an image side thereof and a double-concave lens. Two aspheric surfaces are used, one for the surface in the second lens group G2, which surface is located nearest to an image side thereof, and one for the surface in the third lens group G3, which surface is located nearest to an object side thereof.

For zooming from the wide-angle to telephoto end of the system, the lens groups move together toward the object side of the system while the space between the first lens group G1 and the second lens group G2 becomes wide and the space between the second lens group G2 and the third lens group G3 becomes narrow. For focusing, the second lens group G2 is moved out toward the object side.

Enumerated below are numerical data in each of the above examples. Symbols used hereinafter but not hereinbefore refer to:

f: focal length of the system,

FNO: F-number,

ω: half angle of view, $r_1, r_2, \ldots$ : radius of curvature of each lens surface, $d_1, d_2, \ldots$ : separation between adjacent lenses, $n_{d1}, n_{d2}, \ldots$ : d-line refractive index of each lens, and $v_{d1}, v_{d2}, \ldots$ : d-line Abbe's number of each lens.

It is here to be noted that aspheric shape is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4, A_6, A_8,$ and $A_{10}$ are fourth, sixth, eighth, and tenth aspherical coefficients.

EXAMPLE 1 f = 28.1 ~ 51.9 ~ 96.7
$F_{NO}$ = 4.6 ~ 6.9 ~ 10.2
ω = 31.4° ~ 17.9° ~ 10.0°

| | | | |
|---|---|---|---|
| $r_1$ = −45.9439 | $d_1$ = 1.5051 | $n_{d1}$ = 1.84666 | $v_{d1}$ = 23.78 |
| $r_2$ = −158.3527 | $d_2$ = 0.2059 | | |
| $r_3$ = 18.8068 | $d_3$ = 2.5887 | $n_{d2}$ = 1.51823 | $v_{d2}$ = 58.90 |
| $r_4$ = −106.4175 | $d_4$ = (Variable) | | |
| $r_5$ = −14.6617 | $d_5$ = 1.2516 | $n_{d3}$ = 1.70000 | $v_{d3}$ = 48.08 |
| $r_6$ = 18.6143 | $d_6$ = 0.2316 | | |
| $r_7$ = 18.6488 | $d_7$ = 1.4565 | $n_{d4}$ = 1.78472 | $v_{d4}$ = 25.68 |
| $r_8$ = −148.8422 | $d_8$ = 0.7319 | | |
| $r_9$ = ∞ (Stop) | $d_9$ = 0.9084 | | |
| $r_{10}$ = 18.9592 | $d_{10}$ = 2.6589 | $n_{d5}$ = 1.78472 | $v_{d5}$ = 25.68 |
| $r_{11}$ = 9.6268 | $d_{11}$ = 4.0922 | $n_{d6}$ = 1.63246 | $v_{d6}$ = 63.80 |
| $r_{12}$ = −15.4897 | $d_{12}$ = (Variable) | | |

-continued $$f = 28.1 \sim 51.9 \sim 96.7$$
$$F_{NO} = 4.6 \sim 6.9 \sim 10.2$$
$$\omega = 31.4° \sim 17.9° \sim 10.0°$$

(Aspheric)
$r_{13} = -15.7416$  $d_{13} = 2.6406$  $n_{d7} = 1.71736$  $\nu_{d7} = 29.51$
(Aspheric)
$r_{14} = -13.0658$  $d_{14} = 1.0895$
$r_{15} = -11.3690$  $d_{15} = 1.2559$  $n_{d8} = 1.63246$  $\nu_{d8} = 63.80$
$r_{16} = 96.8487$ Zooming Spaces

| f | 28.1 | 51.9 | 96.7 |
|---|---|---|---|
| $d_4$ | 2.5368 | 9.1810 | 13.5008 |
| $d_{12}$ | 11.8155 | 5.3303 | 1.0010 |

Aspherical Coefficients

12th surface $K = -0.0226$
$A_4 = 1.0370 \times 10^{-4}$
$A_6 = 6.2929 \times 10^{-7}$
$A_8 = -1.4207 \times 10^{-8}$
$A_{10} = 1.9763 \times 10^{-11}$ 13th surface $K = 1.3723$
$A_4 = 1.1318 \times 10^{-4}$
$A_6 = 4.3172 \times 10^{-7}$
$A_8 = -1.8990 \times 10^{-10}$
$A_{10} = 5.9852 \times 10^{-11}$
$f_w/f_{1G} = 0.557$
$\beta_{3GT} = 4.014$

EXAMPLE 2

$$f = 27.8 \sim 52.0 \sim 97.0$$
$$F_{NO} = 4.6 \sim 6.85 \sim 10.2$$
$$\omega = 31.5° \sim 18.0° \sim 10.0°$$

$r_1 = -43.8047$  $d_1 = 1.5186$  $n_{d1} = 1.84666$  $\nu_{d1} = 23.78$
$r_2 = -144.4699$  $d_2 = 0.3097$
$r_3 = 17.9849$  $d_3 = 2.8109$  $n_{d2} = 1.51823$  $\nu_{d2} = 58.90$
$r_4 = -85.1026$  $d_4 = $ (Variable)
$r_5 = -14.9466$  $d_5 = 1.1656$  $n_{d3} = 1.69700$  $\nu_{d3} = 48.53$
$r_6 = 19.0291$  $d_6 = 1.6063$  $n_{d4} = 1.78472$  $\nu_{d4} = 25.68$
$r_7 = -116.7181$  $d_7 = 1.1472$
$r_8 = \infty$ (Stop)  $d_8 = 2.0352$
$r_9 = 19.8823$  $d_9 = 1.3056$  $n_{d5} = 1.78472$  $\nu_{d5} = 25.68$
$r_{10} = 10.3368$  $d_{10} = 3.8241$  $n_{d6} = 1.63246$  $\nu_{d6} = 63.81$
$r_{11} = -16.4492$  $d_{11} = $ (Variable)
(Aspheric)
$r_{12} = -15.6660$  $d_{12} = 2.7307$  $n_{d7} = 1.71736$  $\nu_{d7} = 29.51$
(Aspheric)
$r_{13} = -12.5066$  $d_{13} = 0.8080$
$r_{14} = -11.4608$  $d_{14} = 1.2250$  $n_{d8} = 1.63246$  $\nu_{d8} = 63.81$
$r_{15} = 65.7821$ Zooming Spaces

| f | 27.8 | 52.0 | 97.0 |
|---|---|---|---|
| $d_4$ | 2.0605 | 8.1501 | 11.8371 |
| $d_{11}$ | 11.9074 | 5.3395 | 1.0667 |

Aspherical Coefficients

11th surface $K = -0.3240$
$A_4 = 8.6695 \times 10^{-5}$
$A_6 = -2.0296 \times 10^{-8}$
$A_8 = -3.1135 \times 10^{-9}$
$A_{10} = 2.8285 \times 10^{-11}$ 12th surface $K = 0.4419$ -continued $$f = 27.8 \sim 52.0 \sim 97.0$$
$$F_{NO} = 4.6 \sim 6.85 \sim 10.2$$
$$\omega = 31.5° \sim 18.0° \sim 10.0°$$

$A_4 = 7.5982 \times 10^{-5}$
$A_6 = 3.7884 \times 10^{-8}$
$A_8 = 2.3063 \times 10^{-10}$
$A_{10} = 0$
$f_w/f_{1G} = 0.614$
$\beta_{3GT} = 4.113$

EXAMPLE 3

$$f = 27.8 \sim 54.5 \sim 106.8$$
$$F_{NO} = 4.6 \sim 6.85 \sim 10.2$$
$$\omega = 31.5° \sim 17.0° \sim 9.0°$$

$r_1 = -37.2683$  $d_1 = 1.5051$  $n_{d1} = 1.84666$  $\nu_{d1} = 23.78$
$r_2 = -82.5096$  $d_2 = 0.2059$
$r_3 = 22.4390$  $d_3 = 2.8063$  $n_{d2} = 1.51823$  $\nu_{d2} = 58.90$
$r_4 = -53.7689$  $d_4 = $ (Variable)
$r_5 = -14.1245$  $d_5 = 1.2479$  $n_{d3} = 1.81600$  $\nu_{d3} = 46.62$
$r_6 = 17.3979$  $d_6 = 0.2316$
$r_7 = 16.2602$  $d_7 = 2.0254$  $n_{d4} = 1.75520$  $\nu_{d4} = 27.51$
$r_8 = -46.8538$  $d_8 = 0.7319$
$r_9 = \infty$ (Stop)  $d_9 = 1.8336$
$r_{10} = 19.6204$  $d_{10} = 1.4879$  $n_{d5} = 1.80518$  $\nu_{d5} = 25.42$
$r_{11} = 9.9819$  $d_{11} = 4.0126$  $n_{d6} = 1.63246$  $\nu_{d6} = 63.82$
$r_{12} = -15.9375$  $d_{12} = $ (Variable)
(Aspheric)
$r_{13} = -20.5049$  $d_{13} = 2.6406$  $n_{d7} = 1.71736$  $\nu_{d7} = 29.51$
(Aspheric)
$r_{14} = -15.2839$  $d_{14} = 1.7478$
$r_{15} = -11.3428$  $d_{15} = 1.2559$  $n_{d8} = 1.63246$  $\nu_{d8} = 63.82$
$r_{16} = 69.7644$ Zooming Spaces

| f | 27.8 | 54.5 | 106.8 |
|---|---|---|---|
| $d_4$ | 2.5368 | 8.9510 | 13.0853 |
| $d_{12}$ | 12.6892 | 5.5244 | 1.0010 |

Aspherical Coefficients

12th surface $K = -0.0732$
$A_4 = 8.8528 \times 10^{-5}$
$A_6 = 6.4277 \times 10^{-7}$
$A_8 = -1.7012 \times 10^{-8}$
$A_{10} = 1.6039 \times 10^{-10}$ 13th surface $K = 3.2591$
$A_4 = 1.0705 \times 10^{-4}$
$A_6 = 4.8272 \times 10^{-7}$
$A_8 = -1.8945 \times 10^{-10}$
$A_{10} = 6.0176 \times 10^{-11}$
$f_w/f_{1G} = 0.583$
$\beta_{3GT} = 4.365$

EXAMPLE 4

$$f = 25.8 \sim 50.0 \sim 97.0$$
$$F_{NO} = 4.6 \sim 6.85 \sim 10.2$$
$$\omega = 32.8° \sim 18.6° \sim 10.0°$$

$r_1 = -66.2170$  $d_1 = 1.2823$  $n_{d1} = 1.84666$  $\nu_{d1} = 23.78$
$r_2 = 309.0936$  $d_2 = 0.2555$
$r_3 = 17.8461$  $d_3 = 2.7575$  $n_{d2} = 1.53966$  $\nu_{d2} = 47.32$
$r_4 = -230.6629$  $d_4 = $ (Variable)

-continued $f = 25.8 \sim 50.0 \sim 97.0$
$F_{NO} = 4.6 \sim 6.85 \sim 10.2$
$\omega = 32.8° \sim 18.6° \sim 10.0°$

| | | | |
|---|---|---|---|
| $r_5 = -13.5988$ | $d_5 = 1.2322$ | $n_{d3} = 1.69622$ | $\nu_{d3} = 47.74$ |
| $r_6 = 46.1499$ | $d_6 = 1.5165$ | $n_{d4} = 1.78472$ | $\nu_{d4} = 25.68$ |
| $r_7 = -36.5493$ | $d_7 = 1.0972$ | | |
| $r_8 = \infty$ (Stop) | $d_8 = 1.8987$ | | |
| $r_9 = 18.7104$ | $d_9 = 1.3551$ | $n_{d5} = 1.78472$ | $\nu_{d5} = 25.68$ |
| $r_{10} = 9.9930$ | $d_{10} = 4.9363$ | $n_{d6} = 1.63246$ | $\nu_{d6} = 63.82$ |
| $r_{11} = -16.5143$ (Aspheric) | $d_{11} =$ (Variable) | | |
| $r_{12} = -14.2333$ (Aspheric) | $d_{12} = 2.4867$ | $n_{d7} = 1.71736$ | $\nu_{d7} = 29.51$ |
| $r_{13} = -11.6116$ | $d_{13} = 1.1649$ | | |
| $r_{14} = -10.4652$ | $d_{14} = 1.2945$ | $n_{d8} = 1.65806$ | $\nu_{d8} = 63.70$ |
| $r_{15} = 72.4324$ | | | |

Zooming Spaces

| f | 25.8 | 50.0 | 97.0 |
|---|---|---|---|
| $d_4$ | 2.5303 | 8.8015 | 12.8311 |
| $d_{11}$ | 10.2546 | 4.5465 | 1.0518 |

Aspherical Coefficients

11th surface

K = 0.4894
$A_4 = 1.1720 \times 10^{-4}$
$A_6 = 2.0128 \times 10^{-7}$
$A_8 = 2.9664 \times 10^{-11}$
$A_{10} = -2.7017 \times 10^{-10}$ 12th surface K = 1.2151
$A_4 = 1.4039 \times 10^{-4}$
$A_6 = 3.6289 \times 10^{-7}$
$A_8 = 3.8524 \times 10^{-10}$
$A_{10} = 9.0212 \times 10^{-11}$
$f_W/f_{1G} = 0.448$
$\beta_{3GT} = 4.512$

EXAMPLE 5

$f = 28.0 \sim 51.9 \sim 96.9$
$F_{NO} = 4.7 \sim 6.9 \sim 10.2$
$\omega = 31.0° \sim 17.8° \sim 9.9°$

| | | | |
|---|---|---|---|
| $r_1 = -105.9614$ | $d_1 = 1.5000$ | $n_{d1} = 1.83400$ | $\nu_{d1} = 37.16$ |
| $r_2 = 105.9614$ | $d_2 = 0.2000$ | | |
| $r_3 = 18.3149$ | $d_3 = 3.0096$ | $n_{d2} = 1.48749$ | $\nu_{d2} = 70.23$ |
| $r_4 = -110.8653$ | $d_4 =$ (Variable) | | |
| $r_5 = -13.8794$ | $d_5 = 1.2000$ | $n_{d3} = 1.65844$ | $\nu_{d3} = 50.88$ |
| $r_6 = 42.4731$ | $d_6 = 0.3000$ | | |
| $r_7 = 17.9366$ | $d_7 = 2.4950$ | $n_{d4} = 1.69895$ | $\nu_{d4} = 30.13$ |
| $r_8 = \infty$ | $d_8 = 0.8000$ | | |
| $r_9 = \infty$ (Stop) | $d_9 = 1.8000$ | | |
| $r_{10} = 17.4325$ | $d_{10} = 1.2000$ | $n_{d5} = 1.78472$ | $\nu_{d5} = 25.68$ |
| $r_{11} = 9.8817$ | $d_{11} = 3.6732$ | $n_{d6} = 1.58913$ | $\nu_{d6} = 61.14$ |
| $r_{12} = -17.3047$ (Aspheric) | $d_{12} =$ (Variable) | | |
| $r_{13} = -14.0821$ (Aspheric) | $d_{13} = 3.1454$ | $n_{d7} = 1.69895$ | $\nu_{d7} = 30.13$ |
| $r_{14} = -11.6355$ | $d_{14} = 1.6820$ | | |
| $r_{15} = -10.3579$ | $d_{15} = 1.4000$ | $n_{d8} = 1.64000$ | $\nu_{d8} = 60.07$ |
| $r_{16} = 96.5907$ | | | |

Zooming Spaces

| f | 28.0 | 51.9 | 96.9 |
|---|---|---|---|
| $d_4$ | 2.5000 | 8.7997 | 12.9234 |
| $d_{12}$ | 10.6438 | 5.0388 | 1.5000 |

-continued $f = 28.0 \sim 51.9 \sim 96.9$
$F_{NO} = 4.7 \sim 6.9 \sim 10.2$
$\omega = 31.0° \sim 17.8° \sim 9.9°$ Aspherical Coefficients 12th surface K = 0.2069
$A_4 = 1.5292 \times 10^{-4}$
$A_6 = 7.0801 \times 10^{-7}$
$A_8 = 1.7439 \times 10^{-9}$
$A_{10} = 0$ 13th surface K = -0.9265
$A_4 = 2.7087 \times 10^{-5}$
$A_6 = 3.0339 \times 10^{-7}$
$A_8 = -1.8420 \times 10^{-10}$
$A_{10} = 0$
$f_W/f_{1G} = 0.43$
$\beta_{3GT} = 4.30$ FIGS. 5 to 9 are aberration diagrams for Examples 1 to 5 of the zooming optical systems of the invention upon being focused on an object point at infinity. In FIGS. 5 to 9, (a) represents an aberration diagram at a wide-angle end, (b) an aberration diagram at standard settings, and (c) an aberration diagram at a telephoto end, and SA, AS, DT, and CC stand for spherical aberration, astigmatism, distortion, and chromatic aberration of magnification, respectively.

As can be understood from the foregoing description, the present invention provides a three-group zoom optical system which, albeit having a zoom ratio as high as 3 or greater, is reduced in terms of the number of lenses in each group and the total lens length upon collapsing, and is so compact.

What we claim is:

1. A zoom optical system consisting of, in order from an object side of said system:

a first lens group having positive refracting power;
a second lens group having positive refracting power; and
a third lens group having negative refracting power,
wherein said first, second and third lens groups move together toward said object side for zooming from a wide-angle end of said system to a telephoto end of said system while a space between said first lens group and said second lens group becomes wide and a space between said second lens group and said third lens group becomes narrow, said second lens group comprises, in order from an object side thereof, a front lens subgroup having negative refracting power and a rear lens subgroup having positive refracting power, an aperture stop is located between said front lens subgroup and said rear lens subgroup in said second lens group, an aspheric surface is used for at least one surface in said rear lens subgroup in said second lens group, and said zoom optical system satisfies the following condition (1):

$$0.4 < f_W/f_{1G} < 1.0 \qquad (1)$$

where $f_W$ is a focal length of said zoom optical system at said wide-angle end and $f_{1G}$ is a focal length of said first lens group.

2. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, said first lens group comprises, in order from an object side thereof, a negative lens concave on the object side and a positive lens, said second lens group consists of, in order from an object side thereof, a front lens subgroup having negative refracting power, an aperture stop and a rear lens subgroup having positive refracting power, a lens surface in said front lens subgroup in said second lens group, which surface is located nearest to said object side, is concave on said object side, said rear lens subgroup consists of two lens elements, and said third lens group comprises, in order from an object side thereof, a positive lens and a double-concave lens.

3. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, said second lens group consists of, in order from an object side thereof, a front lens subgroup having negative refracting power, an aperture stop and a rear lens subgroup having positive refracting power, said rear lens subgroup consisting of two lens elements, an aspheric surface is used for at least one surface in said rear lens subgroup in said second lens group, and said zoom optical system satisfies the following condition (1):

$$0.4 < f_W/f_{1G} < 1.0 \tag{1}$$

where $f_W$ is a focal length of said zoom optical system at said wide-angle end and $f_{1G}$ is a focal length of said first lens group.

4. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, said second lens group consists of, in order from an object side thereof, a front lens subgroup having negative refracting power, an aperture stop and a rear lens subgroup having positive refracting power, said rear lens subgroup consisting of one lens component, an aspheric surface is used for at least one surface in said rear lens subgroup in said second lens group, and said zoom optical system satisfies the following condition (1):

$$0.4 < f_W/f_{1G} < 1.0 \tag{1}$$

where $f_W$ is a focal length of said zoom optical system at said wide-angle end and $f_{1G}$ is a focal length of said first lens group.

5. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, said second lens group comprises, in order from an object side thereof, a front lens subgroup having negative refracting power and a rear lens subgroup having positive refracting power, an aperture stop is located between said front lens subgroup and said rear lens subgroup in said second lens group, said second lens group consists of four lens elements and an aperture stop, an aspheric surface is used for at least one surface in said rear lens subgroup in said second lens group, and said zoom optical system satisfies the following condition (1):

$$0.4 < f_W/f_{1G} < 1.0 \tag{1}$$

where $f_W$ is a focal length of said zoom optical system at said wide-angle end and $f_{1G}$ is a focal length of said first lens group.

6. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, said first lens group consists of a meniscus lens element concave on said object side and a positive lens element, said second lens group comprises, in order from an object side thereof, a front lens subgroup having negative refracting power and a rear lens subgroup having positive refracting power, an aperture stop is located between said front lens subgroup and said rear lens subgroup in said second lens group, an aspheric surface is used for at least one surface in said rear lens subgroup in said second lens group, and said zoom optical system satisfies the following condition (1):

$$0.4 < f_W/f_{1G} < 1.0 \tag{1}$$

where $f_W$ is a focal length of said zoom optical system at said wide-angle end and $f_{1G}$ is a focal length of said first lens group.

7. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, wherein:

said second lens group comprises, in order from an object side thereof, a front lens subgroup having negative refracting power and a rear lens subgroup having positive refracting power, an aperture stop is located between said front lens subgroup and said rear lens subgroup in said second lens group, an aspheric surface is used for at least one surface in said rear lens subgroup in said second lens group, said zoom optical system satisfies the following condition (1):

$$0.4 < f_W/f_{1G} < 1.0 \tag{1}$$

where $f_W$ is a focal length of said zoom optical system at said wide-angle end and $f_{1G}$ is a focal length of said first lens group, and said first lens group, said second lens group and said third lens group comprises seven lens components or less in all.

8. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide angle end of said system to a telephoto end of said system while a space between said first lens group and said second lens group becomes wide and a space between said second lens group and said third lens group becomes narrow, said first lens group comprises, in order from an object side thereof, a negative lens concave on the object side and a positive lens, said second lens group consists of, in order from an object side thereof, a front lens subgroup having negative refracting power, an aperture stop and a rear lens subgroup having positive refracting power, a lens surface in said front lens subgroup in said second lens group, which surface is located nearest to said object side, is concave on said object side, said rear lens subgroup consisting of one lens component, and said third lens group comprises, in order from an object side thereof, a positive lens and a double-concave lens.

9. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, said first lens group comprises, in order from an object side thereof, a negative lens concave on the object side and a positive lens, said second lens group comprises, in order from an object side thereof, a front lens subgroup having negative refracting power, and a rear lens subgroup having positive refracting power, a lens surface in said front lens subgroup in said second lens group, which surface is located nearest to said object side, is concave on said object side, said third lens group comprises, in order from an object side thereof, a positive lens and a double-concave lens, an aperture stop is located between said front lens subgroup and said rear lens subgroup in said second lens group, and said second lens group consists of four lens elements and an aperture.

10. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, said first lens group consists of, in order from an object side thereof, a negative meniscus lens element concave on the object side and a positive lens element, said second lens group comprises, in order from an object side thereof, a front lens subgroup having negative refracting power, and a rear lens subgroup having positive refracting power, a lens surface in said front lens subgroup in said second lens group, which surface is located nearest to said object side, is concave on said object side, said third lens group comprises, in order from an object side thereof, a positive lens and a double-concave lens, and an aperture stop is located between said front lens subgroup and said rear lens subgroup in said second lens group.

11. A zoom optical system comprising, in order from an object side of said system:

a first lens group having positive refracting power;

a second lens group having positive refracting power; and a third lens group having negative refracting power, wherein said first, second and third lens groups move together toward said object side for zooming from a wide-angle end of said system to a telephoto end of said system while a space between said first lens group and said second lens group becomes wide and a space between said second lens group and said third lens group becomes narrow, wherein:

said first lens group comprises, in order from an object side thereof, a negative lens concave on the object side and a positive lens, said second lens group comprises, in order from an object side thereof, a front lens subgroup having negative refracting power, and a rear lens subgroup having positive refracting power, a lens surface in said front lens subgroup in said second lens group, which surface is located nearest to said object side, is concave on said object side, said third lens group comprises, in order from an object side thereof, a positive lens and a double-concave lens, an aperture stop is located between said front lens subgroup and said rear lens subgroup in said second lens group, and said first lens group, said second lens group and said third lens group comprise seven lens components or less in all.

12. The zoom optical system according to claim 3 or 4, wherein said rear lens subgroup in said second lens group consists of a doublet consisting of, in order from an object side thereof, a negative lens element and a positive lens element.

13. The zoom optical system according to claim 1, 5, 6, or 7, wherein said rear lens subgroup in said second lens group comprises a doublet consisting of, in order from an object side thereof, a negative lens and a positive lens.

14. The zoom optical system according to claim 1, 3, 4, 5, or 7, wherein said first lens group comprises, in order from an object side thereof, a negative concave lens on said object side and a positive lens.

15. The zoom optical system according to claim 14, wherein said negative concave lens in said first lens group is a negative meniscus lens concave on said object side, and said positive lens in said first lens group is a double-convex lens.

16. The zoom optical system according to claim 14, wherein said negative concave lens in said first lens group is a double-concave lens, and said positive lens in said first lens group is a double-convex lens.

17. The zoom optical system according to claim 1, 3, 4, 5, 6, or 7 wherein a lens surface in said front lens subgroup in said second lens group, which surface is located nearest to said object side, is concave on said object side.

18. The zoom optical system according to claim 1, 3, 4, 5, 6, or 7, wherein said third lens group comprises, in order from an object side thereof, a positive lens and a double-concave lens.

19. The zoom optical system according to claim 18, wherein said positive lens in said third lens group is a positive meniscus lens concave on said object side.

20. The zoom optical system according to claim 1, 3, 4, 5, 6, or 7, wherein at least one aspheric surface is used in said third lens group.

21. The zoom optical system according to claim 1, 3, 4, 5, 6, or 7, wherein focusing with respect to a nearby object is performed by moving said second lens group toward said object side of said system.

22. The zoom optical system according to claim 1, 3, 4, 5, 6, or 7, which satisfies the following condition (2):

$$3.5 < \beta_{3GT} \tag{2}$$

where $\beta_{3GT}$ is a transverse magnification of said third lens group at said telephoto end.

23. The zoom optical system according to claim 2, 8, 9, 10, or 11, wherein at least one aspheric surface is used in said rear lens subgroup in said second lens group.

24. The zoom optical system according to claim 1, 2, 3, 4, 5, 6, 7, 8, 9, 10, or 11, wherein said front lens subgroup in said second lens group comprises, in order from an object side thereof, a negative lens concave on said object side and a double-convex lens.

25. The zoom optical system according to claim 2, 3, 4, 5, 6, 7, 8, 9, 10 or 11, wherein only said first, second and third lens groups move during said zooming.

* * * * *